US006167174A

United States Patent [19]
Zhang et al.

[11] Patent Number: 6,167,174
[45] Date of Patent: Dec. 26, 2000

[54] MULTIPLE PORT, FIBER OPTIC ISOLATOR

[75] Inventors: B. Barry Zhang, Lawrenceville, N.J.; Liang-Ju Lu, Eden Prairie, Minn.

[73] Assignee: ADC Telecommunications, Inc., Minnetonka, Minn.

[21] Appl. No.: 09/179,588

[22] Filed: Oct. 27, 1998

[51] Int. Cl.[7] .................................................. G02B 6/32
[52] U.S. Cl. .............................. 385/33; 385/31; 385/34; 359/256
[58] Field of Search .................................. 385/31, 33, 34, 385/11; 359/484, 256, 281

[56] References Cited

U.S. PATENT DOCUMENTS

| Re. 35,575 | 7/1997 | Pan | 385/33 |
|---|---|---|---|
| 4,178,073 | 12/1979 | Uchida et al. | 359/484 |
| 4,239,329 | 12/1980 | Matsumoto | 385/11 |
| 4,548,478 | 10/1985 | Shirasaki | 359/256 |
| 4,712,880 | 12/1987 | Shirasaki | 359/484 |
| 5,082,343 | 1/1992 | Coult et al. | 385/34 |
| 5,151,955 | 9/1992 | Ohta et al. | 385/6 |
| 5,161,049 | 11/1992 | Tanno et al. | 359/281 |
| 5,237,445 | 8/1993 | Kuzuta | 359/281 |
| 5,262,892 | 11/1993 | Nakamura | 359/484 |
| 5,315,431 | 5/1994 | Masuda et al. | 359/281 |
| 5,345,329 | 9/1994 | Shirai et al. | 359/282 |
| 5,359,689 | 10/1994 | Iwatsuka et al. | 385/73 |
| 5,381,261 | 1/1995 | Hirai et al. | 359/282 |
| 5,402,509 | 3/1995 | Fukushima | 385/33 |
| 5,408,491 | 4/1995 | Hirai etal. | 372/92 |
| 5,428,477 | 6/1995 | Siroki | 359/484 |
| 5,446,578 | 8/1995 | Chang et al. | 359/282 |
| 5,452,122 | 9/1995 | Tsuneda et al. | 359/281 |
| 5,499,132 | 3/1996 | Tojo et al. | 359/281 |
| 5,499,307 | 3/1996 | Iwatsuka | 385/11 |
| 5,539,574 | 7/1996 | Robinson | 359/484 |
| 5,546,486 | 8/1996 | Shih et al. | 385/31 |
| 5,557,692 | 9/1996 | Pan et al. | 385/11 |
| 5,566,259 | 10/1996 | Pan et al. | 385/11 |
| 5,574,809 | 11/1996 | Watanabe et al. | 385/11 |
| 5,579,420 | 11/1996 | Fukushima | 385/31 |
| 5,581,640 | 12/1996 | Pan et al. | 385/11 |
| 5,602,673 | 2/1997 | Swan | 359/281 |
| 5,631,771 | 5/1997 | Swan | 359/484 |
| 5,642,447 | 6/1997 | Pan et al. | 385/31 |
| 5,642,448 | 6/1997 | Pan et al. | 385/31 |
| 5,661,829 | 8/1997 | Zheng | 385/33 |
| 5,691,845 | 11/1997 | Iwatsuka et al. | 359/497 |

FOREIGN PATENT DOCUMENTS

| 0 215 973 | 9/1985 | European Pat. Off. . |
|---|---|---|
| 0 915 358 A2 | 5/1999 | European Pat. Off. . |
| 2 604 203 | 3/1997 | United Kingdom . |
| WO 98/23983 | 6/1998 | WIPO . |

OTHER PUBLICATIONS

Matsumoto, T., "Polarization–Independent Isolators for Fiber Optics", *Electronics & Communications in Japan*, 62–C(7):113–119 Jul. 1979).

Shiraishi, *Polarization–Independent In–Line Optical Isolator with Lens–Free Configuration*, Dec. 10, 1992, No. 12 New York, US, pp. 1839–1842.

*Primary Examiner*—Rodney Bovernick
*Assistant Examiner*—Ellen E. Kim
*Attorney, Agent, or Firm*—Altera Law Group LLC

[57] ABSTRACT

A multiport isolator provides optical isolation between pairs of optical fibers so that light may pass from a first fiber to a second fiber of the pair, but not from the second fiber to the first fiber. The multiport isolator has first and second coupling modules to couple light from different fibers, and an isolator module between the coupling modules to prevent light from passing from the second fiber to the first fiber of a fiber pair.

10 Claims, 7 Drawing Sheets

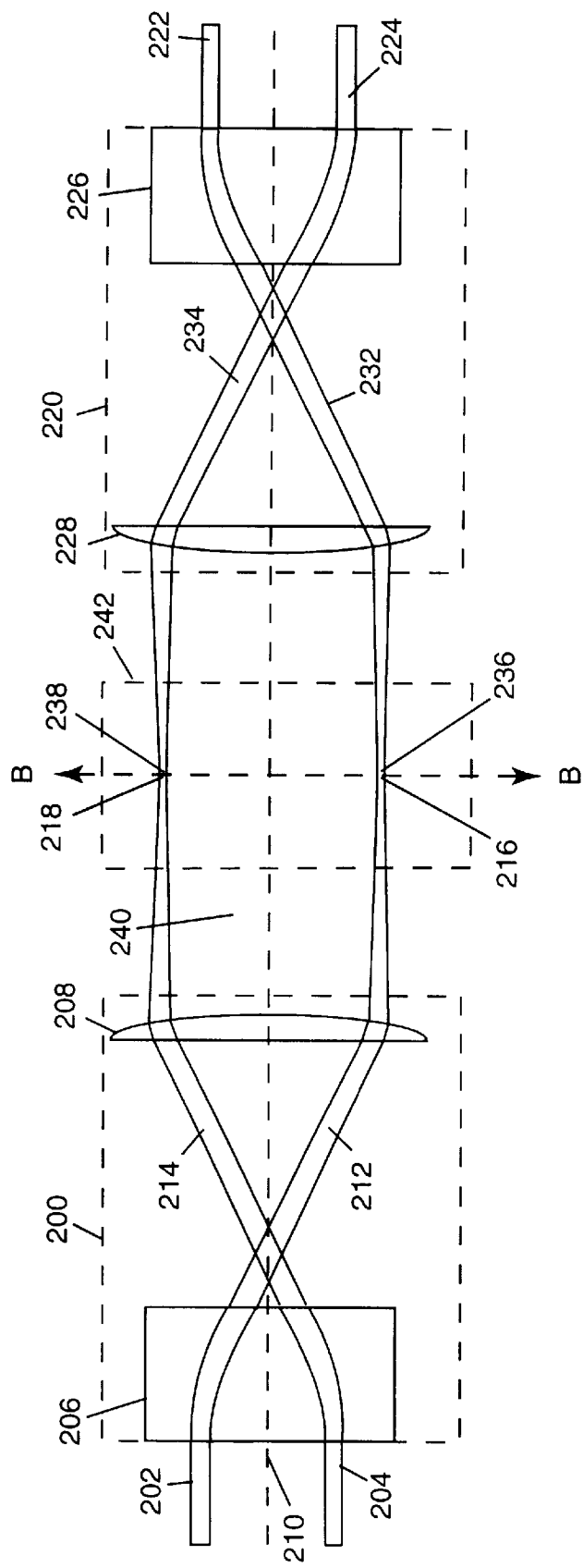

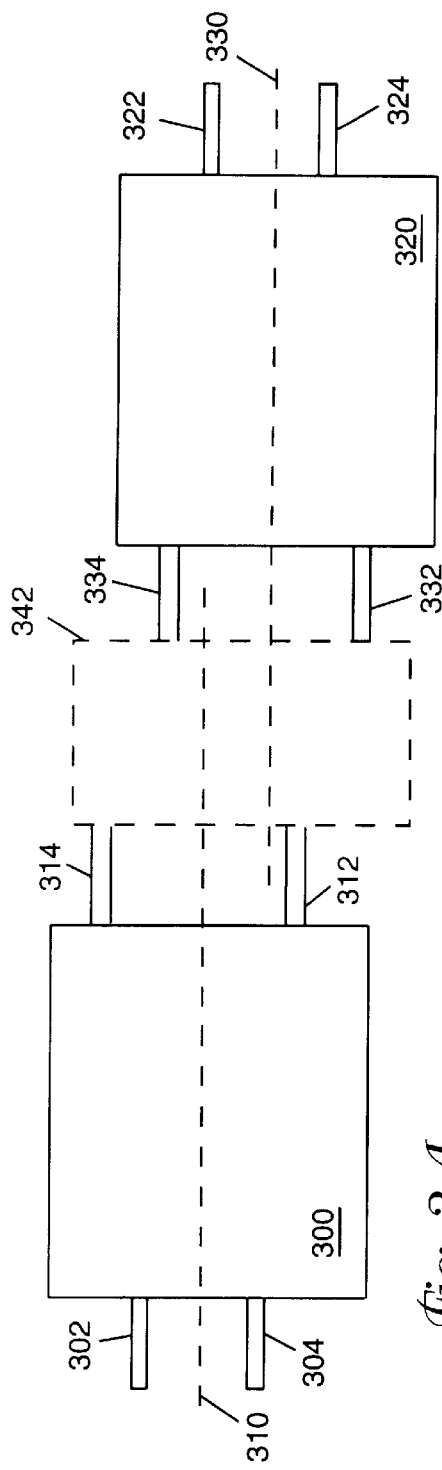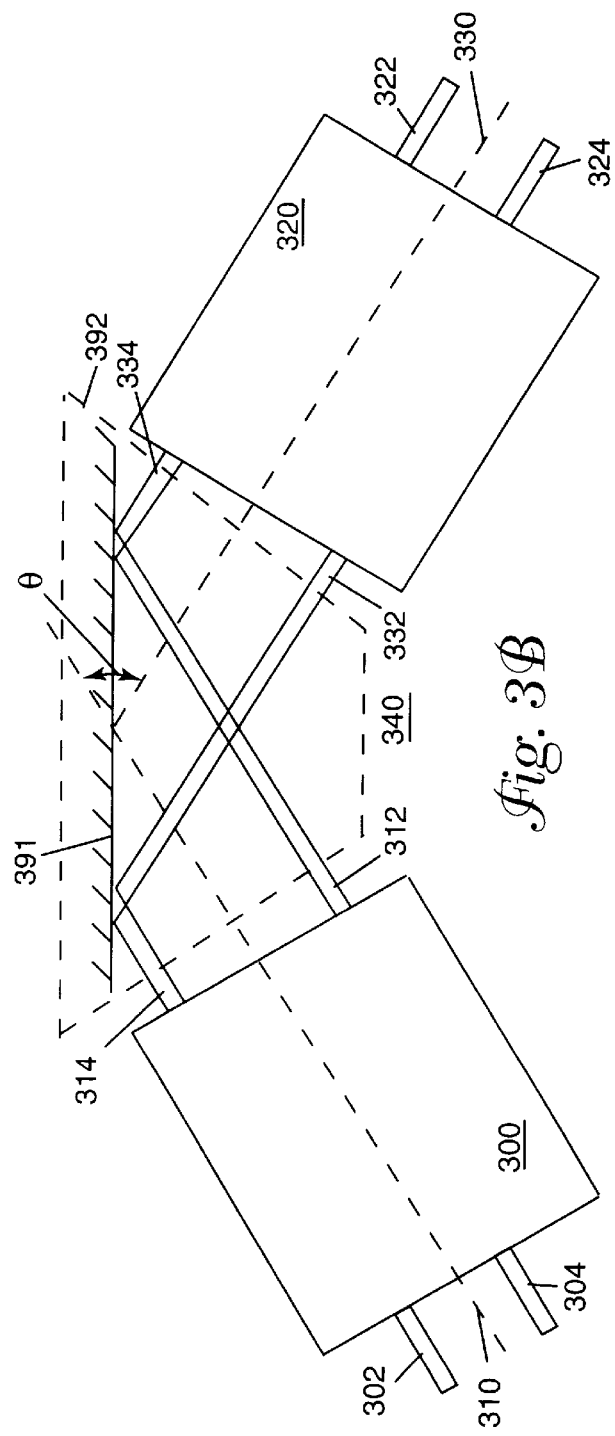

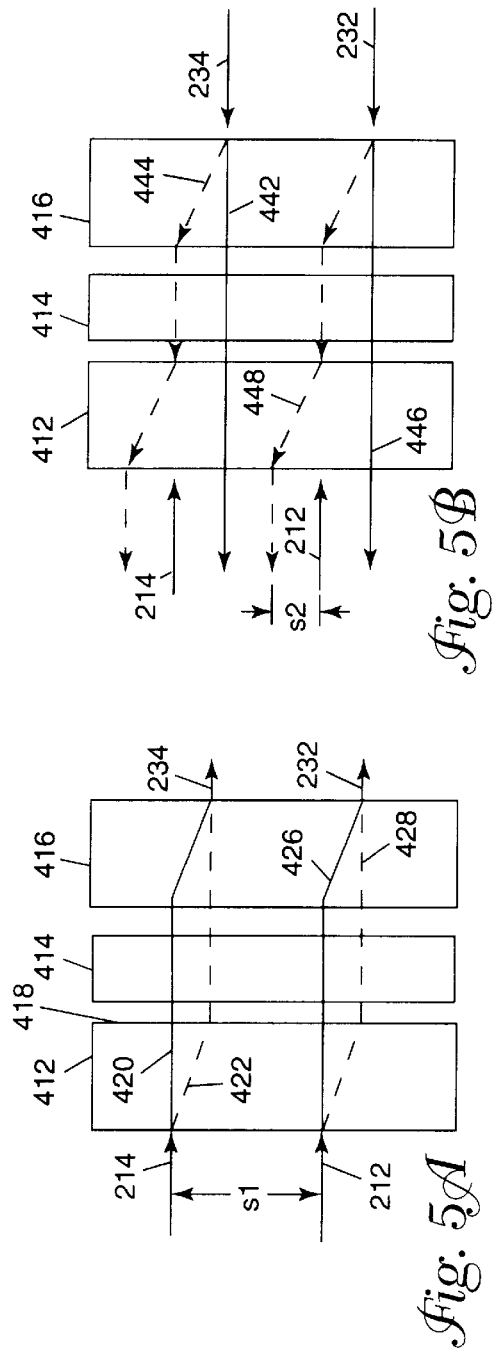
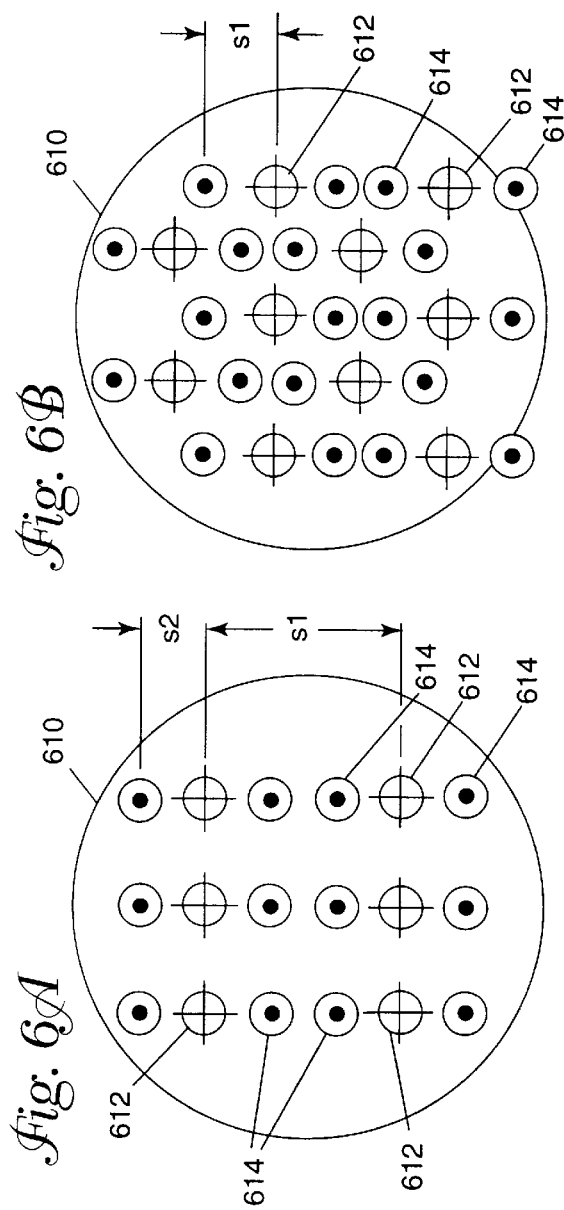

MULTIPLE PORT, FIBER OPTIC ISOLATOR

BACKGROUND

The present invention is directed generally to a fiber optic device, and more particularly to an fiber optic isolator having multiple ports.

Optical fibers find many uses for directing beams of light between two points. Optical fibers have been developed to have low loss, low dispersion, polarization maintaining properties and can also act as amplifiers. As a result, optical fiber systems find widespread use, for example in optical communication applications.

However, one of the important advantages of fiber optic beam transport, that of enclosing the optical beam to guide it between terminal points, is also a limitation. There are several optical components, important for use in fiber systems or in fiber system development, that are not implemented in a fiber-based form where the optical beam is guided in a waveguide. Instead, these optical components are implemented in a bulk form that light must freely propagate through. An example of such a component is an optical isolator. Consequently, the inclusion of a bulk optical isolator in an optical fiber system necessitates that the optical fiber system have a section where the beam path propagates freely in space, rather than being guided within a fiber.

Free space propagation typically requires that the beam from each fiber be collimated and directed along the axis of the bulk component being used in the free-space propagation section. Usually, this necessitates that a collimating lens be positioned at the input fiber to collimate the incoming light and a focusing lens be positioned at the output fiber to focus the freely propagating light into the output fiber. The free-space propagation section lies between the two lenses. The introduction of a free-space propagation section requires that the collimating lens and the focusing lens are each aligned to their respective fibers and also that the focusing lens is correctly aligned relative to the collimated beam path from the collimating lens. The alignment of the corresponding collimating and focusing lens pairs remains critical, irrespective of the number of fibers. Accordingly, the alignment process becomes more complex and time consuming when multiple fibers require the alignment of multiple collimating and focusing lenses into multiple isolators.

In addition, each collimating and focusing lens and each fiber has to be supported transversely. The provision of transverse support increases the total cross-section required by each fiber/lens assembly, thus resulting in a large system.

Accordingly, there is a need for an improved approach to introducing a free-space propagation section into fiber optic systems that is simpler to align and is more compact. Additionally, there is a need for compact isolators that are capable of handling several inputs.

SUMMARY OF THE INVENTION

Generally, the present invention relates to a multiport isolator that provides optical isolation between pairs of optical fibers so that light may pass from a first fiber to a second fiber of a fiber pair, but not from the second fiber to the first fiber. The multiport isolator has first and second coupling modules to couple light from different fibers, and an isolator module between the coupling modules.

An embodiment of the multiport isolator includes first and second coupling modules couplable to a plurality of optical fibers to receive light beams therefrom. Each coupling module includes a first focusing element positioned on a module optical axis having a first focusing power selected to direct the light beams to intersect the module optical axis, and a second focusing element spaced apart from the first focusing element by an interelement separation distance along the module optical axis. The second focusing element is positioned to receive the light beams from the first focusing element, and has a second focusing power. The interelement separation distance is selected to parallelize the light beams received from the first focusing element.

An isolator module is positioned between the two coupling modules. A first beam path of at least one of the parallelized beams from the first coupling module passes in a forward direction through the isolator module and couples light into a second beam path of a parallelized beam of the second coupling module. Also, light passing from the second coupling module backwards along the second beam path towards the first coupling module is prevented from passing to the first coupling module backwards along the first beam path by the isolator module.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 2A illustrates a pair of multiple beam coupling modules used in conjunction with multiple fibers to produce a free-space propagation region, according to an embodiment of the present invention;

FIGS. 3A–3C illustrate different configurations of coupling modules to accommodate bulk optical components having different optical geometries;

FIGS. 5A and 5B schematically illustrate the forward and reverse travelling light beams in the embodiment illustrated in FIGS. 4A and 4B.

FIGS. 6A and 6B illustrate two dimensional arrangements of forward and reverse optical beams on an input surface of the isolator of FIGS. 4A and 4B.

Figure 1A:
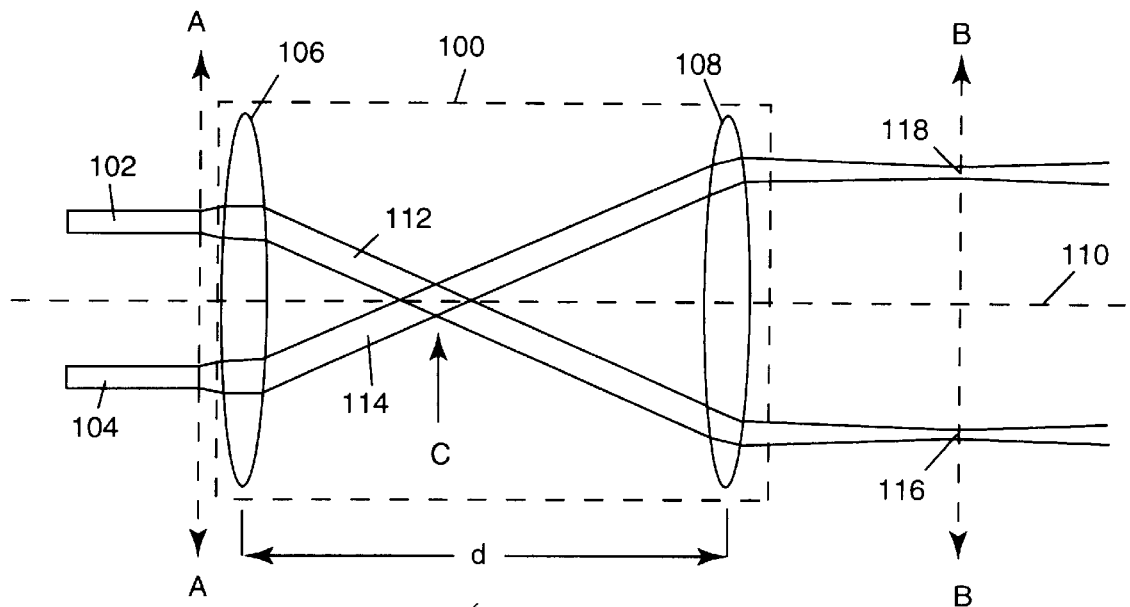
FIGS. 1A and 1B illustrate different embodiments of a multiple beam coupling module according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to optical fiber systems, and is believed to be particularly suited to introducing a free-space propagation section into an optical fiber system. The approach presented here is simpler to align than conventional systems and is more compact.

The present system is based on the use of a coupling module that receives the input from a number of input fibers and generates a set of freely propagating, parallel optical beams. This is termed a parallelizing operation. The coupling module is simple to align and includes only two lenses. The coupling module, having only two lenses, may be used to parallelize outputs from a large number of fibers. The coupling module is described in U.S. patent application Ser. No. 09/181,142, attorney Docket No. 2316.977US01, entitled "Multiple Port, Fiber Optic Coupling Device", filed on Oct. 27, 1998, by the present inventors, and incorporated herein by reference.

The coupling module can also be used in a reverse manner, to receive a number of parallel, freely propagating beams and to focus these beams into a number of output fibers. This is termed a deparallelizing operation.

Since each coupling module can be used for both parallelizing and deparallelizing operations, a free-space coupling unit can be constructed having a region for free-space propagation in between two coupling modules. The first coupling module parallelizes incoming light from one set of fibers to generate parallel beams propagating through the free-space propagation region. The second coupling module deparallelizes the light into the second set of fibers. Likewise, for light travelling in the opposite direction through the fiber system, the second coupling module parallelizes light received from the second set of fibers to propagate freely along parallel beam paths in the free-space propagation section. The first coupling module deparallelizes the light into the first set of fibers.

A schematic of a coupling module 100 is illustrated in FIG. 1A, showing the optical paths followed by beams from two input fibers, 102 and 104. Two fibers are employed in the illustration for the purposes of clarity and simplicity of the following explanation. No limitation on the invention is suggested by the illustration of two input fibers, and more fibers may be used.

The coupling module 100 includes two lenses, a first lens 106 and a second lens 108, positioned on the optical axis 110. The light paths 112 and 114, from fibers 102 and 104 respectively, pass through the first lens 106 and are directed to cross the optical axis 110 at the position marked C. Where the outputs of the fibers 102 and 104 are aligned parallel to the optical axis 110, the position C is separated from the first lens 106 by a distance equal to the focal length, f1, of the first lens 106. After crossing the axis 110, the beam paths 112 and 114 propagate to the second lens 108 which is positioned at a separation "d" from the first lens 106. Where the second lens has a focal length f2, the separation d is equal to approximately f1+f2. Following transmission through the second lens 108, the beam paths 112 and 114 propagate parallel to the optical axis 110.

Although the beam paths 112 and 114 are illustrated to be collimated between the two lenses 106 and 108, this is not a necessary condition. Collimation of the beam paths 112 and 114 between the first and second lenses 106 and 108 depends on the divergence of the optical beams passing out of the optical fibers 102 and 104, the separation between the first lens 106 and the fibers 102 and 104, and the focal length of the first lens.

After transmission through the second lens 108, the beam paths 112 and 114 converge to produce beam waists 116 and 118 respectively in the plane BB designated by a dashed line. The separation distance between the plane BB and the second lens 108 depends on the divergence of the light beams entering the first lens 106, and the separation distance between the output faces of the fiber 102 and 104. The separation distance d is set to be equal to approximately f1+f2 in order to maintain a parallel output from the second lens 108 and is not available as an adjustment.

Each beam waist 116 and 118 forms an image of the output face of the respective fiber 102 and 104. It is an important feature of the invention that the coupling module 100 relay an image of the output faces of the fibers 102 and 104, lying on the input plane AA designated by a dashed line, to the image plane BB. The image formed at plane BB may be a magnified image.

The first and second lenses may be different types of lens, for example, they may be spherical or aspheric, and may be bi-convex, plano-convex or meniscus. The selection of lens type is dependent on the particular system and the level of acceptable optical aberration, which translates to optical loss.

Figure 1B:
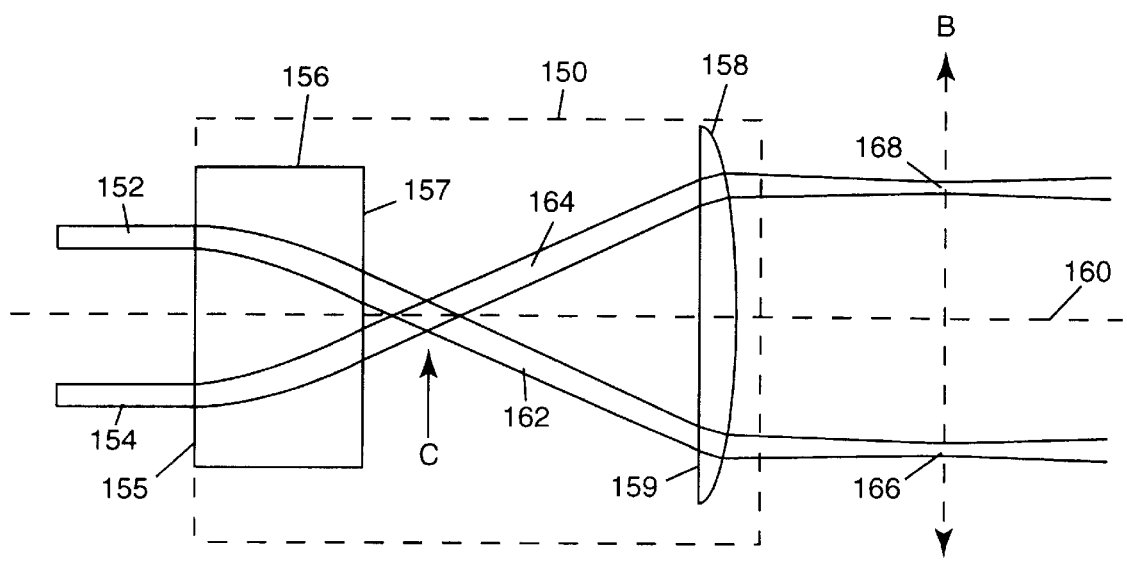

Another embodiment of a coupling module 150 is illustrated in FIG. 1B. The coupling module 150 receives the output from two input fibers 152 and 154. The coupling module 150 includes first and second lenses 156 and 158 aligned along an optical axis 160. The first lens 156 is a gradient index (GRIN) lens, a type of lens commonly used in conjunction with optical fibers due to the barrel shape and the flat optical surfaces that are perpendicular to the lens axis. The GRIN lens 156 may be of any suitable pitch that diverts the beam paths 162 and 164 to cross the axis 160. If the GRIN lens is a quarter pitch lens, the output face 157 of the GRIN lens is positioned at the crossing point C. Where the GRIN lens 156 has a pitch of less than 0.25, for example in the range 0.18–0.23, the crossing point C lies beyond the output face 157. Similarly, where the pitch of the GRIN lens 156 is more than 0.25, then the crossing point C lies within the GRIN lens 156.

The second lens 158 may be a plano-convex aspheric lens, oriented with the planar surface 159 oriented towards the crossing point C to reduce aberration effects.

The coupling module 150 relays an image of the input plane to the image plane BB. The image plane BB may also be referred to as the conjugate plane. Where the fibers 152 and 154 are butted against the input face of the GRIN lens 156, the input plane is coincident with the input face 155 of the GRIN lens 156.

The coupling modules 100 and 150 may be used in applications where inputs are received from a number of fibers to be delivered to a non-fiber component or system. For example, the coupling modules 100 and 150 may be used to couple the outputs from fibers in a fiber array to corresponding detectors in a detector array. The coupling modules 100 and 150 may also be used for coupling a free space input of multiple beams to an array of fibers. For example, in one approach to demultiplexing dense wavelength division multiplexed (DWDM) signals, a single, multiplexed, optical beam is diffracted from a curved diffraction grating. The components at different wavelengths, separated by the grating, may be coupled by the coupling module into a number of fibers, each fiber corresponding to one of the wavelength components.

FIG. 2A illustrates a free-space device that uses two opposing coupling modules to create a region of free-space propagation within an optical fiber system. The two coupling modules 200 and 220 are arranged along the same optical axis 210, although this need not be the case, as is discussed below.

The first coupling module 200 receives input light from input fibers 202 and 204. The first coupling module 200 has a first GRIN lens 206 and a second aspherical lens 208. As discussed above, other types of lens may also be used. The beam paths 212 and 214 are directed to cross the optical axis 210 by the first lens 206 and are parallelized by the second lens 208 to be parallel with the optical axis 210. In addition, the beam paths 212 and 214 converge to beam waists 216 and 218 at the image plane BB. In other words, the first coupling module 200 relays an image of the input plane, the plane upon which the exit faces of the input fibers 202 and 204 are located, to the image plane at BB.

The second coupling module 220 is coupled to fibers 222 and 224. The second coupling module 220 has a first GRIN lens 226 and a second aspherical lens 228. As discussed above, other types of lens may also be used. The beam paths 232 and 234 are directed to cross the optical axis 210 by the first lens 226 and are parallelized by the second lens 228 to be parallel with the optical axis 210. In addition, the beam paths 232 and 234 converge to beam waists 236 and 238 at the image plane BB. In other words, the coupling module 220 relays an image of its input plane, the plane upon which the exit faces of the input fibers 222 and 224 are located, to the image plane at BB.

When the beam waists 216 and 236 from the two first fibers 202 and 222 are collocated at the plane BB then, by reciprocity, the image of the exit face of the fiber 202 is focused to the exit face of the corresponding fiber 222, and the image of the exit face of the fiber 222 is focused to the exit face of the fiber 202. Likewise, the image of the exit face of fiber 204 is focused to the exit face of the fiber 224, and vice versa.

Using this system, light coupled out of each fiber is propagated through the free-space region 240 between the two coupling modules 200 and 220, and is redirected into corresponding fibers on the other side of the free-space region. A bulk optical component 242 may be placed between the two coupling modules 200 and 220 to operate on the optical beams propagating through the free-space region 240. As previously described, the bulk optical component is a component that is not implemented in an optical fiber form, and may be an optical switch or array of optical switches, a spatial light modulator, an isolator, a circulator, a filter or some other bulk optical component. The separation between the coupling modules 200 and 220 may be adjusted to compensate for the optical path length traveled through the bulk optical component 242, so that the conjugate planes of each coupling module 200 and 220 remain coincident.

In one particular embodiment, the coupling modules 200 and 220 are made to be identical. In other words, the first lenses 206 and 226 have the same focal length, f1 (or pitch in the case of a GRIN lens), the second lenses 208 and 228 have the same focal length, f2, and the interelement separation between the first and second lenses within each coupling module, d, is the same. An advantage provided when the first and second coupling modules are the same is that the size of the beams focused into the second set of fibers is the same as the size of the beams emitted by the first set of fibers and vice versa. Another advantage provided by this symmetrical arrangement is that the fabrication and assembly process is simplified.

Where the images formed by each coupling module 200 and 220 are not coincident on the same image plane BB, the optical coupling efficiency from one set of fibers to the other set of fibers may be reduced. Further, it will be appreciated that for efficient transfer of optical power from the first set of fibers to the second set of fibers, and vice versa, the geometrical arrangement of each set of fibers should correspond with the other. For example, where the coupling modules 200 and 220 are identical and produce symmetrical imaging from one fiber set to the other, it is important that the lateral displacement and azimuthal position of one fiber, e.g. fiber 202, relative to the optical axis is the same as that for its corresponding, e.g. fiber 222. However, there is no requirement that the coupling modules 200 and 220 be identical.

It is not necessary that the fibers be coupled to the coupling module in a one-dimensional pattern. The fibers may also be coupled in a two-dimensional pattern. The separation between different fibers may be regular, as in an array, or may be irregular. Generally, corresponding fibers on either side of the system are positioned relative to the optical axis to mutually transmit and receive light. Thus, where the set of fibers associated with one coupling module is arranged in, for example, a 4×4 array, the set of corresponding fibers associated with the other coupling module is also in a 4×4 array. The spacing between fibers in each array may be different, depending on the optical properties of each coupling module 200 and 220. It will be appreciated that, although the fibers in one fiber set may advantageously be arranged in a symmetrical manner around the optical axis, a symmetrical arrangement is not a necessary condition, and the fibers may be arranged in an asymmetrical arrangement about the axis. Further, there is no requirement that there be a one-to-one correspondence between the fibers on either side of the system, and only one beam may be coupled from one coupling module into another.

Figure 2B:
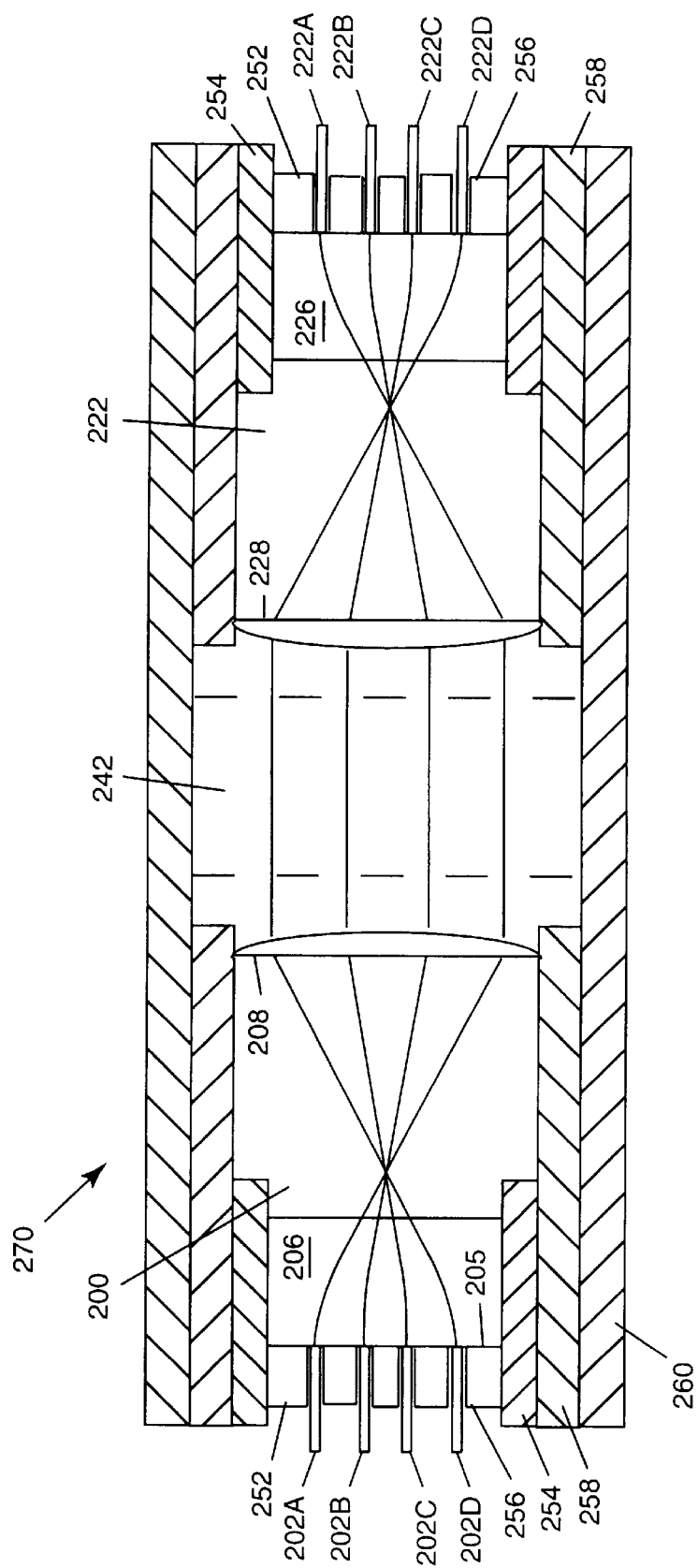
FIG. 2B illustrates a practical embodiment of the example illustrated in FIG. 2A.

Another embodiment of a free-space device is illustrated in FIG. 2B. The optical coupling modules are the same as those illustrated in FIG. 2A, but four optical fibers are coupled to each side of the device, rather than two. Additionally, the optical path between fiber sets is traced out for simplicity, rather than illustrating the width of the optical beam. Each fiber may be regarded as a port enabled for input and output to the device. It can be seen that port 202A on the left side of the device has an optical path coupling to port 222A on the right side of the device. Likewise, ports 202B, 202C, and 202D on the left side of the device have optical paths coupling to corresponding 222B, 222C, 222D on the right side of the device. The device illustrated in this figure also includes mounting components for holding the optical components in position relative to each other. Although the mounting components illustrated may be cylindrical, this is not intended to be a limitation of the invention.

The fibers at ports 202A–202D are butted against the input face of the 205 of the GRIN lens 206. The fibers are held by a chuck 252 that is mounted within first mounting ring 254. The fibers at ports 202A–202D pass through apertures 256 through the chuck 252 and may be held in place within the chuck by, for example, an epoxy or other suitable adhesive. The chuck 252 and the GRIN lens 206 may also be held in place within the first mounting ring 254 by epoxy or other suitable adhesive. The ends of the fibers at ports 202A–202D and the input face of the GRIN lens 206 may be polished at a small angle, for example 8°, and be anti-reflection coated to reduce return reflections.

The coupling module 200 is formed with the first mounting ring 254 assembly and the second lens 208 each mounted within a module ring 258. The first mounting ring 254 and the second lens 208 may also be epoxied in place, or mounted using any other suitable method, such as another adhesive or soldering. In assembly, the second lens 208 is mounted within the module ring 258 and then the first mounting ring is positioned within the module ring 258. The separation between the GRIN lens 206 and the second lens 208 is adjusted until the beam paths beyond the second lens are parallel. One method of ensuring that the beam paths are parallel is to measure the amount of light retroreflected into each fiber by a mirror while adjusting the interelement separation between the GRIN lens 206 and the second lens 208. The free space beams are deemed to be parallel when the level of retroreflected light in each fiber is optimized at the same interelement separation. The first mounting ring 254 is then fixed at that position that is identified as producing parallel beams, using epoxy, adhesive, soldering, or some other suitable method.

Two identical modules 200 and 220 are then positioned within an outer sleeve 260, separated by the bulk optical component 242. The relative orientation between the modules 200 and 220, and the intermodule separation are set so as to achieve maximum optical coupling between the modules 200 and 220. The optimum intermodule separation is achieved when the image plane of the first module 200 coincides with the image plane of the second module 220, as discussed above. The modules 200 and 220 are then fixed in position within the outer sleeve 260 at the optimum relative orientation and intermodule separation. The modules 200 and 220 may be fixed using epoxy, adhesive, soldering, or any other suitable method.

The bulk optical component 242 may be positioned within the outer sleeve 260 as illustrated, or may be mounted on one of the modules prior to that module being inserted into the outer sleeve 260.

It is common for a component such as the assembly shown, to be provided to the user with fiber pig-tails for coupling to the fiber optic system, for example by fusion splicing, through the use of a connector, or in some other appropriate manner. Accordingly, the fibers 202A–202D and 222A–222D may be fiber pig-tails that are rigidly attached to whole assembly 270. However, this is not a limitation of the device, and the fibers of the fiber optic system may be directly coupled to the first focusing elements of the free-space coupling device 270.

Such an assembly may be very compact. In some embodiments of the invention, the GRIN lenses 206 and 226 may have a length of a few millimeters, while the second lens has focal length in the range of around 2–10 mm. Accordingly, the overall length of the device, between GRIN lenses, may lie in the range of 8–40 mm or so.

It will be appreciated that other methods of assembling coupling modules and of mounting modules to produce a free-space coupling device may be employed, and the invention is not limited to those methods illustrated here. For example, the coupling modules may be mounted separately on a bench top with adjustable mounts to provide the necessary degrees of freedom for alignment of the parallel beam paths of each coupling module.

Figure 3C:
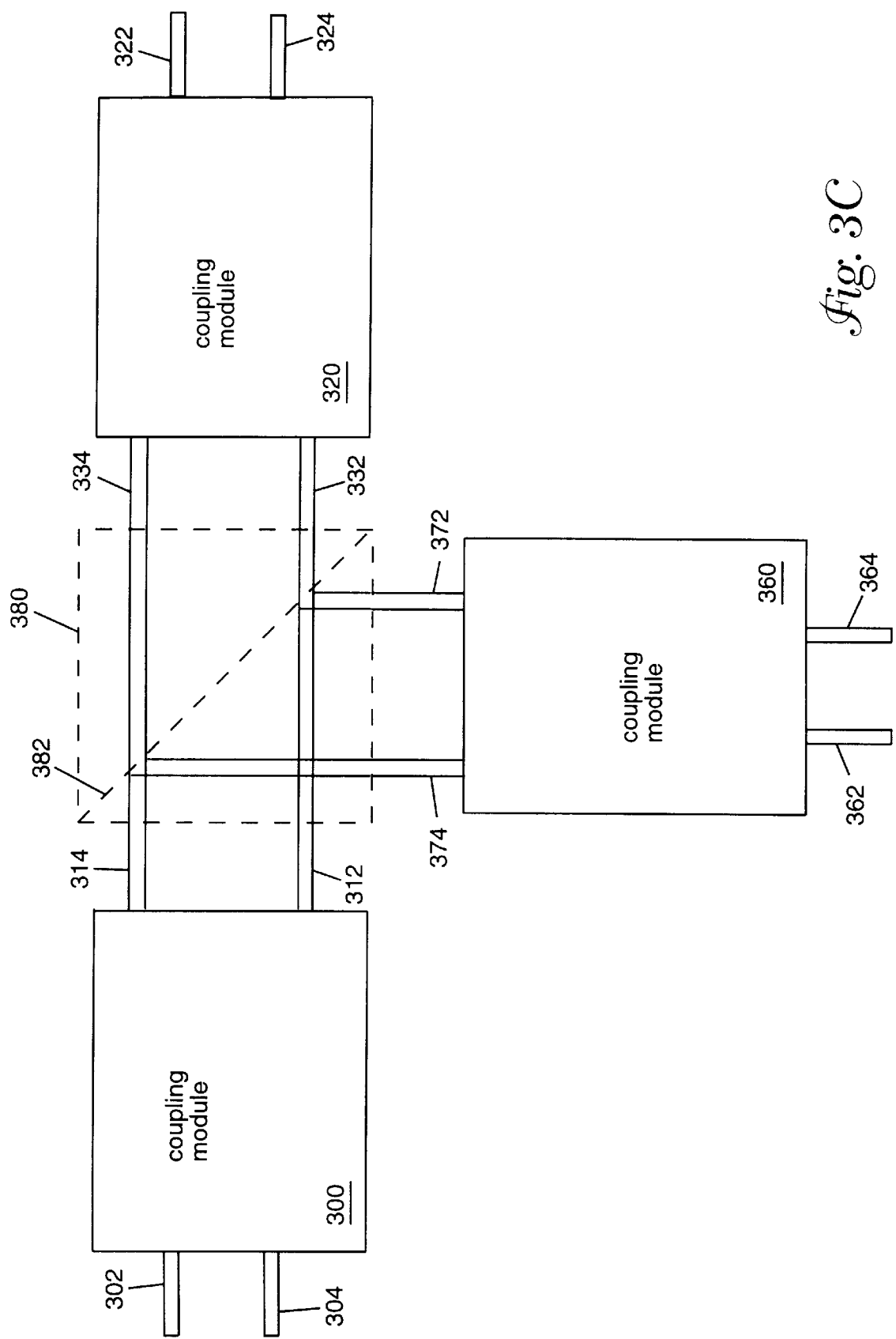

Different embodiments of free-space coupling device are illustrated in FIGS. 3A–3C. In the embodiments illustrated in FIGS. 3A and 3B, the optical axis of each coupling module is not coincident with the optical axis of the other coupling module. An embodiment in which the optical axis of one coupling module is translated relative to the other is illustrated in FIG. 3A. Each coupling module 300 and 320 is shown in schematic form only. The first coupling module 300 has two input fibers 302 and 304, and produces two output beams 312 and 314 parallel to the optical axis 310 of the first module 300. Likewise, the second coupling module 320 has two input fibers 322 and 324, and has two beam paths 332 and 334 that are parallel to the optical axis 330 of the second module 320.

The bulk optical component 342 is positioned in the free-space 340 between the two coupling modules 300 and 320. The bulk optical component 342 translates optical beams passing therethrough, but does not change the direction of propagation. Thus, the beam that is input to the bulk optical component 342 along beam path 312, is output along path 334, and vice versa. Also, the beam that is input along path 314 is output along path 334, and vice versa. Therefore, a bulk optical element 342 that offsets optical beams passing therethrough may be accommodated by the free-space device where the offset between the modules' optical axes 310 and 330 is equal to the amount by which the bulk optical component translates passing optical beams.

In the embodiment illustrated in FIG. 3B, the coupling modules 300 and 320 are the same as those illustrated in FIG. 3A. However, in this case the bulk optical element 392 deviates a beams passing therethrough by an amount θ, for example by reflecting the beams off a mirror 391. In order to accommodate this, the optical axes 310 and 330 are set at a relative angle of θ. Therefore, after the beam path 312 from the first coupling module 300 has been redirected by the bulk optical element 392, its path lies coincident, but antiparallel, with the beam path 332 from the second coupling module 320.

In the embodiment illustrated in the FIG. 3C, the bulk optical element 380 includes a partially reflecting surface 382, which may partially reflect all of the beams passing therethrough, or may totally reflect only some of the beams passing therethrough. The reflector 382 is illustrated to partially reflect all of the beams passing through. A first coupling module 300 has input fibers 302 and 304, and produces respective parallelized beams 312 and 314. A portion of beam 312 is transmitted by the reflector 382 as beam 332 and is coupled into the second coupling module 320. The reflected portion of beam 312 is directed into the third coupling module 360 by the reflector 382 as beam 372. Likewise, a portion of beam 314 is transmitted by the reflector 382 as beam 334 and is coupled into the second coupling module 320. The reflected portion of beam 314 is directed into the third coupling module 360 by the reflector 382 as beam 374. The beams 332, 334, 372 and 374 are then coupled to respective fibers 322, 324, 362 and 364 within the coupling modules 320 and 360. It will be appreciated that light may be coupled in a reverse direction into the first coupling module 300 from the second and third coupling modules 320 and 360. It is preferable in this embodiment that the conjugate planes of all three coupling modules 300, 320 and 360 are coincident, so as to preserve efficient coupling from one module to another.

It will be appreciated that other configurations may also be employed, for example adding a fourth coupling module to the T-configuration of the embodiment illustrated in FIG. 3C to create a X-configuration coupler. In addition, additional coupling modules may be cascaded using a number of partial reflectors so that light from a single module can be coupled into a number of other modules.

Figure 4A:
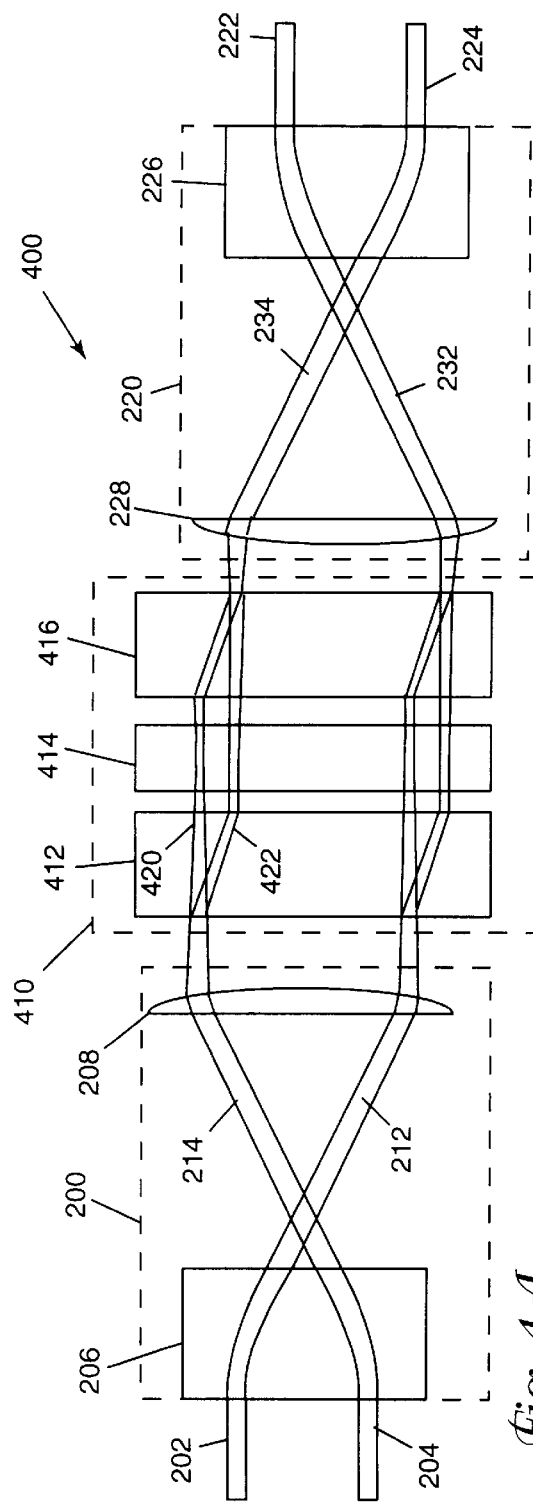
FIGS. 4A and 4B illustrate an isolator assembly according to an embodiment of the present invention.
Figure 4B:
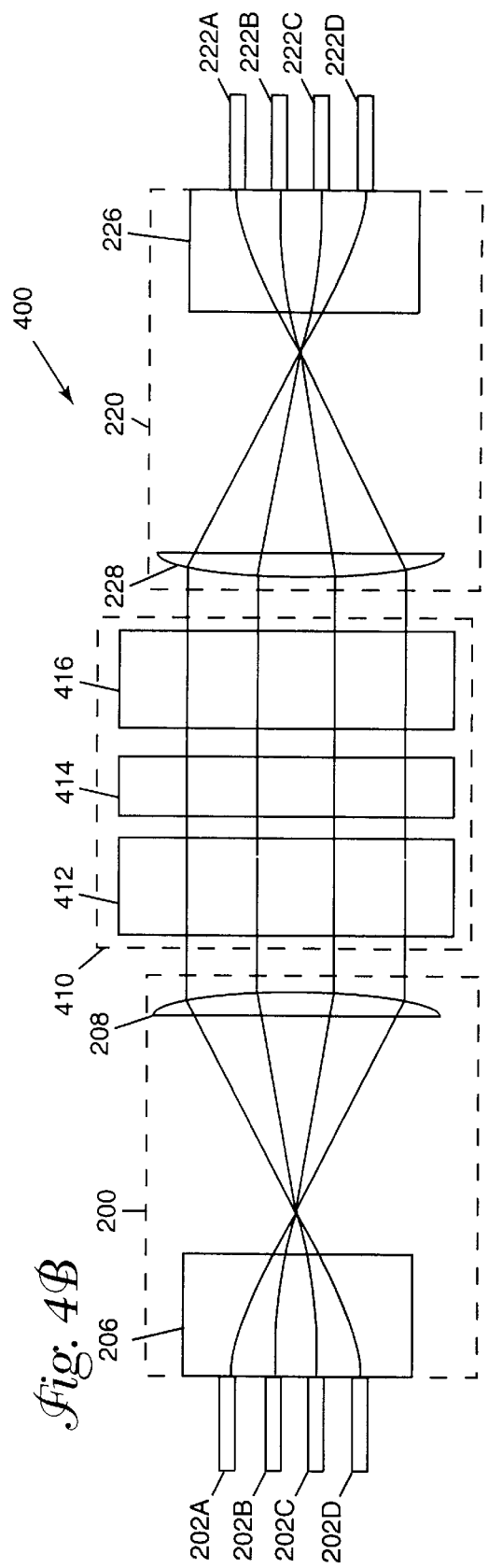

One particular embodiment of the invention is illustrated in FIGS. 4A and 4B, which show top and side views of an isolator assembly 400 respectively. The isolator assembly 400 includes two coupling modules 200 and 220 and an isolator module 410. The isolator module incorporates optical elements that form an isolator. The light entering the assembly 400 through the fibers 202 and 204 from the left of the drawing passes through the isolator assembly 400 to the output fibers 222 and 224. The isolator prevents light from passing through the assembly 400 in the reverse direction.

FIGS. 4A and 4B illustrate are eight fibers coupled to each side of the assembly 400. The fibers in the upper row 202 of fibers coupled to the first coupling module 200 are labelled 202A, 202B, 202C and 202D. Likewise, fibers in the upper row 222 of fibers coupled to the second module are labelled 222A, 222B, 222C, and 222D. The optical beam paths 212 and 214 are shown in FIG. 4A to have a non-zero width, whereas the beam paths illustrated in FIG. 4B are drawn as rays. In the embodiment shown, the isolator module 410 includes a first birefringent plate 412, a Faraday rotator 414 and a second birefringent plate 416.

FIG. 4A illustrates light paths 420 and 422 through the isolator module for light propagating in the right-going direction, from the first coupling module 200 to the second coupling module. The crystal axes of the first and second birefringent plates 412 and 416 are rotated relative to each other, and the Faraday rotator is aligned to rotate polarization of light by 45°. The first light path 420 (solid lines) is followed by light that propagates through the first birefringent plate 412 towards the second coupling module 220 as an ordinary ray. The second light path 422 (dashed lines) is followed by light that propagates through the first birefringent plate 412 as an extraordinary ray. The second light path 422 is displaced relative to the first light path 420 upon exiting the first birefringent plate 412.

The first and second light paths 420 and 422 pass through the Faraday rotator 414, where the polarization of the light propagating along each path is rotated by 45° in a first direction. The first rotation direction may be clockwise or counter-clockwise, as viewed along the direction of propagation. The crystal axis of the second birefringent plate 416 is rotated relative to that of the first birefringent plate 412 so that the light propagating along the first beam 420 path enters the second birefringent plate 416 as an extraordinary ray. Accordingly, the first light path 420 is deviated towards the second light path 422. The light propagating along the second light path 422 enters the second birefringent plate 416 as an ordinary ray. The first and second light paths 420 and 422 recombine at the output surface 418 of the second birefringent plate 416, and the light continues along path 234 to the second coupling module 220.

The forward optical path through the isolator module 400 is shown in schematic in FIG. 5A, which illustrates the beam travelling forward along beam path 214, the first and second beam paths 420 and 422, and the path 234 that couples into the second coupling module 220. Also shown is the beam travelling forward along beam path 212 that enters the first birefringent plate 412 at a point separated from beam path 214 by a distance "s1". The path of the light propagating through the first birefringent plate 412 as an ordinary ray is illustrated as path 426, while the path of light propagating through the first birefringent plate 412 as an extraordinary ray is illustrated as path 428. Paths 426 and 428 combine on the output surface 418 of the first birefringent plate 412.

The reverse optical path through the isolator module 410 is shown in FIG. 5B. Here, light enters the isolator module 410 from the right side, along beam paths 232 and 234. Light entering the second birefringent plate 416 as an ordinary ray propagates along the first path 442, while light entering as an extraordinary ray propagates along second path 444. The polarization direction of the light on the first and second paths path 442 and 444 is rotated by the Faraday rotator 414 by approximately 45° in a second direction which is opposite to the first direction of rotation. Note that the direction of rotation is measured for a viewer looking along the direction of propagation. For example, if the polarization direction of the forward travelling light is rotated in a clockwise direction by 45°, then the polarization direction of the backward travelling light is rotated in a counter-clockwise direction by 45°. Consequently, the light that propagates through the second birefringent plate 416 as an ordinary ray also propagates through the first birefringent plate 412 as an ordinary ray, and exits the first birefringent plate along a path that is different from the path 214 followed by light incoming from the left. Additionally, the light that propagates through the second birefringent plate 416 as an extraordinary ray, along path 444, also propagates through the first birefringent plate 412 as an extraordinary ray, along path 446, which exits the first birefringent plate along a path that is also different from the path 214. Therefore, light passes through the isolator module 410 in the right-going direction from path 214 to path 234. However, light does not pass in the left-going direction from path 234 to path 214, and so the isolator module 410 is effective at isolating the components on the left side of the isolator module 410 from components on the right side of the module 410.

A second set of beam paths is shown for left-going light from the beam path 232. The light that enters the second birefringent plate 416 from beam path 232 in a left-going direction as an ordinary ray follows path 446, while light entering as an extraordinary ray follows path 448. Neither path 446 nor path 448 couple to input path 212.

A single isolator module 410 may be used as an isolator for multiple beam paths, e.g. 212 and 214. Additionally, the isolator module 410 is effective for use with multiple paths arranged in a two dimensional pattern to pass through the assembly 400. However, care should be taken to avoid light from on one of the left-going beam paths from coupling back into a right-going beam path. This may require that the separation s1 between forward traveling beams should be greater than the separation s2, the separation distance between a right-going beam and one of its associated left-going beams, e.g. the separation between path 212 and path 448.

Input beams to such an isolator may be arranged as illustrated in FIG. 6A. The input face 610 to the isolator module 410 is illustrated as having a number of different beams 612 entering into the face 612, denoted by circles with crosses. Each entering beam 612 has two concomitant exiting beams 614, each denoted by a dot within a circle. The exiting beams 614 are spatially separated from the associated entering beam 612 by a distance s2. When the entering beams 612 are arranged in a pattern where one entering beam is above another entering beam 612, the separation s1 is preferably greater than s2 in order to avoid feeding an exiting beam 614 along the same path as an entering beam 612. A staggered arrangement of entering beams 612 may be used, as illustrated in FIG. 6B, in order to more closely pack entering beams 612 on the input face 610.

No limitation on the type of isolator module is intended by the illustrations provided herein. Many other different types of isolator modules are suitable for use with the present invention. One example of another isolator module that may be used with the present invention is based on the isolator design, having birefringent wedges, that is described in U.S. Pat. No. 4,547,478, incorporated herein by reference. Where an isolator is based on the use of compensating wedged birefringent plates, it may be effective to use beam paths through the birefringent plates that are arranged to have the same path length through the wedge.

The present invention permits a single isolator module to provide an isolating function to multiple beam paths, instead of requiring a single isolator module for each beam path. Therefore, the present invention permits a reduction in the number of isolator components present in a fiber optic system and may provide isolation for several beam paths in a small package.

As noted above, the present invention is applicable to fiber optic systems and is believed to be particularly useful in providing isolation capabilities in fiber optical systems having multiple fibers. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An isolator system for coupling to a plurality of optical fibers, comprising:

first and second coupling modules couplable to the plurality of optical fibers to receive light beams therefrom, each coupling module including:

a first focusing element positioned on a module optical axis having a first focusing power selected to direct the light beams to intersect the module optical axis, and a second focusing element spaced apart from the first focusing element by an interelement separation distance along the module optical axis and positioned to receive the light beams from the first focusing element, the second focusing element having a second focusing power, the interelement separation distance being selected to parallelize the light beams received from the first focusing element; and an isolator module positioned between the two coupling modules;

wherein a first beam path of at least one of the parallelized beams from the first coupling module passes in a forward direction through the isolator module and couples light into a second beam path of a parallelized beam of the second coupling module, and light passing from the second coupling module backwards along the second beam path towards the first coupling module is prevented from passing to the first coupling module backwards along the first beam path by the isolator module.

2. A system as recited in claim 1, further comprising first and second pluralities of pig-tailed fibers respectively connected to the first and second coupling modules, and couplable to the plurality of optical fibers.

3. A system as recited in claim 1, wherein the module optical axis of the first coupling module lies parallel to, but displaced relative to, the module optical axis of the second optical axis.

4. A system as recited in claim 1, wherein each coupling module has a respective conjugate plane separated from the second focusing element by an image distance determined by the first focusing power, the second focusing power and the interelement separation distance.

5. A system as recited in claim 4, wherein the image distance in each coupling module is approximately equal to a focal length of the respective second focusing element.

6. A system as recited in claim 4, wherein the second focusing elements of the first and second coupling modules are separated by a distance equal to the sum of image distances of the first and second coupling modules.

7. A system as recited in claim 1, wherein the first focusing power, the second focusing power interelement separation distance of the first coupling module are respectively essentially equal to the first focusing power, the second focusing power and interelement separation distance of the second coupling module.

8. A system as recited in claim 1, wherein an intermodule separation distance between the second focusing elements of the first and second coupling modules is essentially equal to a sum of focal lengths of the second focusing elements of the first and second coupling modules.

9. A system as recited in claim 1, wherein the isolator module includes first and second birefringent element and a Faraday rotator positioned between the first and second birefringent elements.

10. A system as recited in claim 9, wherein the first birefringent element is comfigured to split a light beam entering from the first coupling module into first and second beams of orthogonal polarization, the Faraday rotator is adapted to rotate the polarization of the first and second beams and the second birefringent element is configured to combine the first and second beams into an output beam coupled to the second coupling module.

* * * * *